United States Patent

Nava

[11] Patent Number: 5,925,409
[45] Date of Patent: Jul. 20, 1999

[54] RESINS FOR LINING SURFACES

[75] Inventor: Hildeberto Nava, Cary, N.C.

[73] Assignee: Reichhold, Inc., Durham, N.C.

[21] Appl. No.: 08/919,090

[22] Filed: Aug. 27, 1997

[51] Int. Cl.$^6$ ........................................................ B05D 3/02
[52] U.S. Cl. ........................... 427/238; 528/44; 528/45; 528/75; 528/80; 528/85; 528/422; 525/123; 525/124; 525/329.5; 525/329.9; 525/330.5; 525/374; 525/440; 525/457; 427/239; 427/388.2
[58] Field of Search ..................... 528/44, 45, 75, 528/80, 85, 422; 525/123, 124, 329.5, 329.9, 330.5, 374, 440, 457; 427/238, 239, 230, 385.5, 388.1, 388.2

[56] References Cited

U.S. PATENT DOCUMENTS

| | | | |
|---|---|---|---|
| 3,621,093 | 11/1971 | Svoboda et al. | 264/331 |
| 3,701,748 | 10/1972 | Kroekel | 260/40 |
| 3,859,162 | 1/1975 | Johnson et al. | 161/160 |
| 4,009,063 | 2/1977 | Wood | 156/71 |
| 4,048,512 | 9/1977 | Wood | 290/53 |
| 4,062,826 | 12/1977 | Hutchinson et al. | 260/40 TN |
| 4,064,211 | 12/1977 | Wood | 264/95 |
| 4,071,503 | 1/1978 | Thomas et al. | 525/440 |
| 4,073,828 | 2/1978 | Ferrarini et al. | 260/859 R |
| 4,076,945 | 2/1978 | Elmer | 560/25 |
| 4,128,601 | 12/1978 | McCluskey | 260/862 |
| 4,148,844 | 4/1979 | von Bonin et al. | 260/874 |
| 4,169,866 | 10/1979 | Von Bonin et al. | 525/131 |
| 4,232,133 | 11/1980 | Ferrarini, Jr. et al. | 525/452 |
| 4,260,538 | 4/1981 | Iseler et al. | 260/40 R |
| 4,289,684 | 9/1981 | Kallaur | 260/40 R |
| 4,525,498 | 6/1985 | Atkins et al. | 523/511 |
| 4,577,388 | 3/1986 | Wood | 29/588 |
| 4,673,706 | 6/1987 | Atkins | 525/31 |
| 4,701,988 | 10/1987 | Wood | 29/33 T |
| 4,752,511 | 6/1988 | Driver | 428/36 |
| 4,762,585 | 8/1988 | Schneider et al. | 156/294 |
| 4,778,553 | 10/1988 | Wood | 156/287 |
| 4,836,715 | 6/1989 | Wood | 405/150 |
| 4,845,161 | 7/1989 | Richardson | 525/399 |
| 4,861,828 | 8/1989 | Waggoner | 525/132 |
| 4,871,811 | 10/1989 | Gaku et al. | 525/148 |
| 4,897,135 | 1/1990 | Aylor, Jr. et al. | 156/94 |
| 4,901,424 | 2/1990 | Menendez | 29/451 |
| 4,916,023 | 4/1990 | Kawabata et al. | 428/482 |
| 4,961,894 | 10/1990 | Yabe et al. | 264/259 |
| 4,976,290 | 12/1990 | Gelin et al. | 138/141 |
| 4,980,116 | 12/1990 | Driver | 264/516 |
| 4,991,006 | 2/1991 | Wood | 358/100 |
| 5,008,363 | 4/1991 | Mallon et al. | 528/49 |
| 5,018,545 | 5/1991 | Wells | 134/113 |

(List continued on next page.)

FOREIGN PATENT DOCUMENTS

| | | |
|---|---|---|
| 121083 | 2/1984 | European Pat. Off. . |
| 157635 | 10/1985 | European Pat. Off. . |
| 628582A2 | 5/1994 | European Pat. Off. . |
| 691379A1 | 1/1995 | European Pat. Off. . |
| 805172A2 | 4/1997 | European Pat. Off. . |
| 9-188807 | 7/1997 | Japan . |
| 9-324121 | 12/1997 | Japan . |
| 1373278 | 11/1974 | United Kingdom . |
| WO89/11507 | 11/1989 | WIPO . |

OTHER PUBLICATIONS

Elmer, O.C., et al., "Peroxide Cocatalyst Curing Systems for Saturated Polypropylene Ether Urethan Elastomers", *Rubber Chem. Technol.*, 44(4), pp. 923–936 (1971), (ACS Abstract).

*Primary Examiner*—Erma Cameron
*Attorney, Agent, or Firm*—Myers Bigel Sibley & Sajovec

[57] ABSTRACT

A method of lining a surface of a substrate comprises providing a reactive mixture which comprises (1) a resin containing active hydrogens; (2) a polycarbodiimide; and (3) an organic diluent; reacting the resin containing active hydrogens and the polycarbodiimide to chemically bind the resin and the polycarbodiimide; applying the chemically bound resin and polycarbodiimide to the surface of the substrate; and curing the chemically bound resin and polycarbodiimide in the presence of an initiator to form a cured resin material which lines the surface of the substrate.

30 Claims, 2 Drawing Sheets

U.S. PATENT DOCUMENTS

| | | | |
|---|---|---|---|
| 5,044,405 | 9/1991 | Driver et al. | 138/98 |
| 5,047,588 | 9/1991 | Taylor | 564/252 |
| 5,066,705 | 11/1991 | Wickert | 524/457 |
| 5,081,173 | 1/1992 | Taylor | 524/195 |
| 5,106,875 | 4/1992 | Horn et al. | 521/137 |
| 5,115,072 | 5/1992 | Nava et al. | 528/67 |
| 5,172,730 | 12/1992 | Driver | 138/104 |
| 5,212,234 | 5/1993 | Van Gasse et al. | 525/43 |
| 5,272,204 | 12/1993 | Akimoto et al. | 524/700 |
| 5,274,067 | 12/1993 | Kressdorf et al. | 528/75 |
| 5,276,096 | 1/1994 | Serdiuk et al. | 525/123 |
| 5,281,634 | 1/1994 | Hesse et al. | 523/514 |
| 5,296,545 | 3/1994 | Heise | 525/28 |
| 5,318,395 | 6/1994 | Driver | 409/132 |
| 5,324,795 | 6/1994 | Suenaga | 525/444 |
| 5,334,670 | 8/1994 | Uchida et al. | 525/440 |
| 5,359,005 | 10/1994 | Kania et al. | 525/203 |
| 5,371,148 | 12/1994 | Taylor et al. | 525/293 |
| 5,371,167 | 12/1994 | Rehfuss et al. | 528/73 |
| 5,373,080 | 12/1994 | Imashiro et al. | 528/67 |
| 5,374,174 | 12/1994 | Long, Jr. | 425/11 |
| 5,382,626 | 1/1995 | Credali et al. | 525/126 |
| 5,393,481 | 2/1995 | Wood | 264/516 |
| 5,393,829 | 2/1995 | Verleg et al. | 525/28 |
| 5,407,483 | 4/1995 | Yokoshima | 118/105 |
| 5,418,310 | 5/1995 | Kangas | 528/59 |
| 5,439,982 | 8/1995 | Taylor et al. | 525/293 |
| 5,451,351 | 9/1995 | Blackmore | 264/449 |
| 5,494,118 | 2/1996 | Wood | 175/22 |
| 5,498,747 | 3/1996 | Pohl et al. | 528/83 |
| 5,504,241 | 4/1996 | Pohl et al. | 528/83 |
| 5,546,992 | 8/1996 | Chick et al. | 138/98 |
| 5,577,864 | 11/1996 | Wood et al. | 405/154 |
| 5,591,291 | 1/1997 | Blackmore | 156/173 |
| 5,597,353 | 1/1997 | Alexander, Jr. | 425/387.1 |
| 5,597,942 | 1/1997 | Pohl et al. | 528/83 |
| 5,606,997 | 3/1997 | Blackmore et al. | 138/98 |
| 5,624,629 | 4/1997 | Wood | 264/516 |
| 5,648,137 | 7/1997 | Blackmore | 428/102 |
| 5,656,231 | 8/1997 | Blackmore | 264/408 |

RESINS FOR LINING SURFACES

FIELD AND BACKGROUND OF THE INVENTION

The present invention relates to a method of utilizing resins for lining substrate surfaces which are damaged or cracked.

Substrates which are exposed to outdoor conditions are utilized in, for example, sidewalks, roads, reservoirs, and the like. These substrates are typically formed from concrete, metals, and polymer composites. In addition to the above, the substrates are employed underground and used in a number of applications relating to the transport of petroleum, natural gas, chemicals, municipal water, and the like. Due to exposure to a number of influences over time such as, for example, temperature fluctuations, ground movements, corrosive fluids, etc., the pipes tend to crack and damage. As a result, the pipes often are unable to successfully transport the above mentioned fluids and thus become unsuitable for their intended use.

Various methods have been proposed to repair the pipes. One approach is presented in U.S. Pat. No. 4,009,063 to Wood, and involves lining the inside of the pipe with a tubular fibrous felt impregnated with a thermosetting resin which contains a catalyst. Wood teaches that the impregnated felt is inserted into the damaged pipe and is inflated using hot air or water. The expansion of the tubular felt molds it into the shape of the pipe. Heat from the hot air or water activates the catalyst causing the resin to cure and form a rigid liner.

Another approach involves utilizing glass fiber which is woven into a tubular shape. The glass fiber is impregnated with a thermosetting resin containing a catalyst, and the resin is then cured. Carbon fiber may be interwoven with the glass fiber such that curing may be accomplished by applying an electrical current to the carbon fibers to generate heat. As a result, the catalyst is activated and the resin cures forming a rigid pipe lining. In this instance, hot air or hot water is not required.

The use of thermally activated catalysts which is described above, however, present disadvantages. Since the catalysts typically require temperatures well above ambient, the viscosity of the impregnated resin decreases while in the pipe. As the viscosity decreases, the resin tends to sag. The resulting pipe lining formed from the resin is non-uniform in appearance and often possesses non-uniform physical properties.

In order to address the above difficulties, agents such as filmed silica have been added to the resins such that they become thixotropic. A thixotropic material is advantageous in that its flow at room temperature is limited in the absence of an applied shear force. Nonetheless, using thixotropic materials is problematic in that their viscosities are excessively high making them difficult to pump. Also, heating thixotropic materials reduces the resin viscosity such that the materials run off and are difficult to contain.

It would be desirable to provide a method of lining damaged surfaces such as those found in pipes or conduits which addresses the problems mentioned above.

SUMMARY OF THE INVENTION

It is therefore an object of the present invention to provide a method for lining a surface with a resin which may be transported more easily to the surface and provide more uniform physical properties to the surface.

To this end and others, the invention provides a method of lining a surface. The method comprises providing a reactive mixture which comprises (1) a resin containing active hydrogens; (2) a polycarbodiimide; and (3) an organic diluent; reacting the resin containing active hydrogens and the polycarbodiimide to chemically bind the resin and the polycarbodiimide; applying the chemically bound resin and polycarbodiimide to the surface of the substrate; and curing the chemically bound resin and polycarbodiimide to form a cured resin material which lines the surface of the substrate.

To cure the chemically bound resin, an initiator is employed. Additionally, in another embodiment, a promoter may be used in conjunction with the initiator.

The invention also provides a method of lining a surface which defines a conduit. The method comprises providing a reactive mixture which comprises (1) a resin containing active hydrogens; (2) a polycarbodiimide; and (3) an organic diluent; inserting the reactive mixture into a tube, the tube being defined by an inner membrane and an outer membrane; reacting the resin containing active hydrogens and the polycarbodiimide to chemically bind the resin and the polycarbodiimide; inserting the tube into a conduit having an inner surface; applying pressure to the tube such that the tube comes in contact with the inner surface of the conduit; and curing the chemically bound resin and polycarbodiimide to form a crosslinked resin material which lines the surface of the conduit.

BRIEF DESCRIPTION OF THE DRAWINGS

In the drawings which form an original portion of the disclosure as filed.

DETAILED DESCRIPTION OF THE PREFERRED EMBODIMENT

Figure 1:
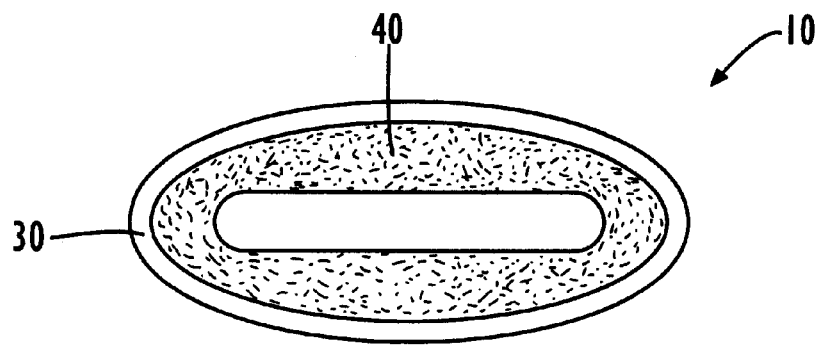
FIG. 1 illustrates a tube filled with a resin according to the invention.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art.

In one aspect, the invention relates to a method for lining a surface of a substrate with a resin, typically the surface of a conduit such as a pipe. The method comprises providing a reactive mixture which comprises (1) a resin containing active hydrogens, (2) a polycarbodiimide, and (3) an organic diluent. The polycarbodiimide is preferably dispersed or contained in the organic diluent during the providing step. The reaction mixture preferably contains greater than about 5 percent by weight of polycarbodiimides. The resin containing active hydrogens and the polycarbodiimide then react such that the resin and the polycarbodiimide become chemically bound, namely the resin becomes thickened. This step is preferably carried out at a temperature between about 5° C. and about 60° C. The chemically thickened resin preferably has a viscosity ranging from about 30,000 centipoise to about 50 million centipoise, and more preferably from about 100,000 centipoise to about 20 million centipoise.

The chemically bound resin and polycarbodiimide is then applied to the surface of the substrate. Subsequently, chemically bound resin and polycarbodiimide is cured to form a crosslinked resin material which lines the surface of the substrate. The curing step is preferably carried out at a temperature between about 40° C. and about 150° C., more preferably between about 50° C. and about 100° C. The curing step is performed in the presence of an initiator.

The invention is advantageous in that the glass transition temperature ($T_g$) of the cured resin material may be enhanced by virtue of the method disclosed herein. Preferably, the $T_g$ of the cured resin material increases from about 5 percent to about 600 percent, and more preferably from about 10 percent to about 300 percent. As a result of this elevation in $T_g$, the physical properties of the cured resin are believed to be enhanced.

As a result of this elevation in $T_g$, it is believed that the physical properties of the cured resin materials are enhanced. Preferably, the cured resin material has a flexural strength ranging from about 3000 psi to about 80,000 psi; a tensile strength ranging from about 1000 psi to about 50,000 psi; and a percent elongation ranging from about 1 to about 1000. In addition to the above, it should be appreciated that various types of resins may have differing preferred ranges of physical property values. For example, cured unsaturated polyester resins preferably have tensile strengths ranging from about 3000 psi to about 50,000 psi and elongations ranging from about 1 to about 10 percent, while cured polyurethanes preferably have tensile strengths ranging from about 800 to about 5000 psi and elongations ranging from about 70 to about 1000.

Preferably, the reactive mixture contains between about 3 to about 50 percent by weight of polycarbodiimide, more preferably between about 3 and about 20 weight percent polycarbodiimide, and most preferably between about 6 and about 12 weight percent polycarbodiimide.

The resin which contains active hydrogens may be selected from a number of resins well known to those skilled in the art. For the purposes of the invention, the term "resin containing active hydrogens" refers to any resin which contains functional groups containing active hydrogens. Functional groups containing active hydrogens can be defined as those which are capable of reacting with polycarbodiimide repeating units (N=C=N). Suitable functional groups including, for example, hydroxyl, carboxyl, amino, phenol, silanol, —P—OH, —P—H, as well as other appropriate substituents. Resins containing active hydrogens include, but are not limited to, saturated polyester resins (e.g., resins employed in hot melt adhesives and powder coatings), unsaturated polyester resins (e.g., resins used in forming molded articles), aliphatic and aromatic polyethers, vinyl ester resins (e.g., resins used in filament winding and open and closed molding), polyurethanes, and mixtures of any of the above.

For the purposes of the invention, unsaturated polyester resins, saturated polyester resins, and vinyl ester resins are preferably employed. An unsaturated polyester resin may be formed from conventional methods. Typically, the resin is formed from the reaction between a polyfunctional organic acid or anhydride and a polyhydric alcohol under conditions known in the art. The polyfunctional organic acid or anhydride which may be employed are any of the numerous and known compounds. Suitable polyfunctional acids or anhydrides thereof include, but are not limited to, maleic acid, fumaric acid, citraconic acid, itaconic acid, glutaconic acid, phthalic acid, isophthalic acid, terephthalic acid, cyclohexane dicarboxylic acid, succinic anhydride, adipic acid, sebacic acid, azealic acid, malonic acid, alkenyl succinic acids such as n-dodecenylsuccinic acid, docecylsuccinic acid, octadecenylsuccinic acid, and anhydrides thereof. Lower alkyl esters of any of the above may also be employed. Mixtures of any of the above are suitable.

Additionally, polybasic acids or anhydrides thereof having not less than three carboxylic acid groups may be employed. Such compounds include 1,2,4-benzenetricarboxylic acid, 1,3,5-benzene tricarboxylic acid, 1,2,4-cyclohexane tricarboxylic acid, 2,5,7-naphthalene tricarboxylic acid, 1,2,4-naphthalene tricarboxylic acid, 1,3,4-butane tricarboxylic acid, 1,2,5-hexane tricarboxylic acid, 1,3-dicarboxyl-2-methyl-2-carboxymethylpropane, tetra (carboxymethyl)methane, 1,2,7,8-octane tetracarboxylic acid, and mixtures thereof.

Suitable polyhydric alcohols which may be used in forming the unsaturated polyester resin include, but are not limited to, ethylene glycol, diethylene glycol, propylene glycol, dipropylene glycol, 1,3-butanediol, 1,4-butanediol, 1,3 hexanediol, neopentyl glycol, 2-methyl-1,3-propanediol, 1,3-butylene glycol, 1,6-hexanediol, hydrogeneated bisphenol "A", cyclohexane dimethanol, 1,4-cyclohexanol, ethylene oxide adducts of bisphenols, propylene oxide adducts of bisphenols, sorbitol, 1,2,3,6-hexatetrol, 1,4-sorbitan, pentaerythritol, dipentaerythritol, tripentaerythritol, sucrose, 1,2,4-butanetriol, 1,2,5-pentanetriol, glycerol, 2-methylpropanetriol, 2-methyl-1,2,4-butanetriol, trimethylol ethane, trimethylol propane, and 1,3,5-trihydroxyethyl benzene. Mixtures of the above alcohols may be used.

The vinyl ester resins employed in the invention include the reaction product of an unsaturated monocarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, sorbic acid, cinnamic acid, and the like, along with mixtures thereof. Epoxy resins which may be employed are known and include virtually any reaction product of a polyfunctional halohydrin, such as epichlorohydrin, with a phenol or polyhydric phenol. Suitable phenols or polyhydric phenols include, for example, resorcinol, tetraphenol ethane, and various bisphenols such as Bisphenol "A", 4,4'-dihydroxydiphenyl sulfone, 4,4'-dihydrohy byphenyl, 4,4'-dihydroxydiphenyl methane, 2,2'-dihydroxydiphenyloxide, and the like. Novolac epoxy resins may also be used. Mixtures of any of the above may be used. Additionally, the vinyl ester resins may have pendant carboxyl groups formed from the reaction of esters and anhydrides and the hydroxyl groups of the vinyl ester backbone.

The resins containing reactive hydrogens may be used alone or in conjunction with other appropriate materials to help enhance physical properties of the resin. Suitable materials include, for example, fibrous reinforcements, fillers, flame retardants, woven and nonwoven fibrous sheets and mats, and the like. Any conventionally known fibrous reinforcement material may be used including fiberglass, polyester, carbon, metal, graphite, high modulus organic fibers (e.g., aromatic polyamides, polybenzimidazoles, and aromatic polyimides), other organic fibers (e.g., polyethylene, liquid crystals, and nylon), and natural fibers. The fibrous materials may be incorporated into the resin in accordance with techniques which are known in the art. Fillers may include but are not limited to calcium carbonate, aluminum oxide, aluminum hydroxide, silica gel, barite, graphite powder, and the like. Mixtures of the above may also be used.

Saturated polyester resins and polyurethanes which are thickened include, for example, those described in U.S. Pat. Nos. 4,871,811; 3,427,346; and 4,760,111, the disclosures of which are incorporated herein by reference in their entirety. The saturated polyester resins and polyurethanes are particularly useful in hot melt adhesives and pressure sensitive adhesive applications. Appropriate saturated polyester resins include, but are not limited to, crystalline and amorphous resins. The resins may be formed by any suitable technique. For example, the saturated polyester resin may be formed by polycondensating an aromatic or aliphatic di- or polycarboxylic acid and an aliphatic or alicyclic di- or polyol or its prepolymer. Optionally, either the polyols may be added in excess to obtain hydroxyl end groups or the dicarboxylic monomers may be added in excess to form carboxylic end groups. Suitable polyurethane resins may be formed by the reaction of diols or polyols as described in U.S. Pat. No. 4,760,111 along with diisocyanates. The diols are added in an excess to obtain hydroxyl end groups at the chain ends of the polyurethane.

Polycarbodiimides which may be employed in the present invention include those which are known in the art. Exemplary polycarbodiimides are described in U.S. Pat. Nos. 5,115,072; 5,081,173; 5,008,363; and 5,047,588; the disclosures of which are incorporated herein by reference in their entirety. The polycarbodiimides can include aliphatic, cycloaliphatic, or aromatic polycarbodiimides.

The polycarbodiimides can be prepared by a number of known reaction schemes. Preferably, the polycarbodiimides are synthesized by reacting an isocyanate-containing intermediate and a diisocyante under suitable reaction conditions. The isocyanate containing intermediate is formed by the reaction between a component, typically a monomer, containing active hydrogens and a diisocyanate. Included are also polycarbodiimides prepared by the polymerization of isocyanates to form a polycarbodiimide, which subsequently react with a component containing active hydrogens.

Components containing active hydrogens, which may be employed are well known and numerous, with monomers being typically utilized. Examples of such monomers include, but are not limited to, acrylates, alcohols, amines, esters, polyesters, thiols, phenols, aromatic and aliphatic polyethers, siloxanes, phosphorus-containing materials, olefins, unsaturated aromatic monomers, and mixtures thereof. Alcohols are typically used, with monofunctional alcohols being preferably employed. Monofunctional alcohols which may be used include, for example, ethanol, butanol, propanol, hexanol, octanol, ethylhexyl alcohol, and longer-chain alcohols (i.e., those alcohols containing up to 50 carbon atoms) and their isomers.

Other monomers having active hydrogens which may be used include, for example, acrylic acid, methacrylic acid, acetic acid, phenylacetic acid, phenoxyacetic acid, propionic acid, hydrocynnamic acid, and the like. Hydroxyalkyl acrylates or methacrylates such as hydroxyethyl acrylate, hydroxyethyl methacrylate, hydroxypropyl acrylate, hydroxypropyl methacrylate, hydroxybutyl acrylate, hydroxybutyl methacrylate, and the like may also be employed. Polyols can be additionally be used including, but not limited to, ethylene glycol; 1,2 and 1,3-propylene glycol; 1,4 and 2,3-butylene glycol; 1,5-pentanediol; 1,6-hexanediol; 1,8-octanediol; neopentyl glycol; 1,4-bis-hydroxymethyl cyclohexane; 2-methyl-1,3-propanediol; glycerol; trimethylolpropane; 1,2,6-hexanetriol; trimethylol ethane; pentaerythritol; quinitol; mannitol; sorbitol; diethylene glycol; triethylene glycol; tetraethylene glycol; 1,4-butanediol; polyethylene glycols having a molecular weight of up to 400; dipropylene glycol; ethoxylated and propoxylated bisphenol "A"; polybutylene glycols having a molecular weight of up to 400; methyl glucoside; diethanolamino-N-methyl phosphonic acid esters; castor oil; diethanolamine; N-methyl ethanolamine; and triethanolamine. Mixtures of any of the above may be used. Any of the above compounds may also include any one or a combination of halogens such as chlorine, fluorine, bromine, or iodine; or phosphorus, or silicon groups.

Diisocyanates which are used in the above reactions are well known to the skilled artisan. For the purposes of the invention, diisocyantes include aliphatic, cycloaliphatic, araliphatic, aromatic and heterocyclic diisocyantes of the type described, for example, by W. Siefken in *Justus Liebigs Annalen der Chemie*, 562, pages 75 to 136, (1949) for example, those corresponding to the following formula:

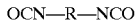

OCN—R—NCO wherein R represents a difunctional aliphatic, cycloaliphatic, aromatic, or araliphatic radical having from about 4 to 25 carbon atoms, preferably 4 to 15 carbon atoms, and free of any group which can react with isocyanate groups. Exemplary diisocyantes include, but are not limited to, toluene diisocyanate; 1,4-tetramethylene diisocyanate; 1,4-hexamethylene diisocyanate; 1,6-hexamethylene diisocyanate; 1,12-dodecane diisocyante; cyclobutane-1,3-diisocyanate; cyclohexane-1,3-diisocyanate; cyclohexane-1,4-diisocyanate; 1-isocyanato-3,3,5-trimethyl-5-isocyanatomethyl cyclohexane; 2,4-hexahydrotolylene diisocyanate; 2,6-hexahydrotolylene diisocyanate; 2,6-hexahydro-1,3-phenylene diisocyanate; 2,6-hexahydro-1,4-phenylene diisocyanate; per-hydro-2,4'-diphenyl methane diisocyanate; per-hydro-4,4'-diphenyl methane diisocyanate; 1,3-phenylene diisocyanate; 1,4-phenylene diisocyanate; 2,4-tolylene diisocyanate, 2,6-tolylene diisocyanates; diphenyl methane-2,4'-diisocyanate; diphenyl methane-4,4'-diisocyanate; naphthalene-1,5-diisocyanate; 1,3-xylylene diisocyanate; 1,4-xylylene diisocyanate; 4,4'-methylene-bis (cyclohexyl isocyanate); 4,4'-isopropyl-bis-(cyclohexyl isocyanate); 1,4-cyclohexyl diisocyanate; 3-isocyanatomethyl-3,5,5-trimethylcyclohexyl isocyanate (IPDI); 1-methyoxy-2,4-phenylene diisocyanate; 1-chloropyhenyl-2,4-diisocyante; p-(1-isocyanatoethyl)-phenyl isocyanate; m-(3-isocyanatobutyl)-phenyl isocyanate; and 4-(2-isocyanate-cyclohexyl-methyl)-phenyl isocyanate. Mixtures of any of the above may be employed. When deemed appropriate, a diisocyante may be employed which contains other functional groups such as hydroxy or amino functionality.

In the reaction involving the component containing active hydrogens and the diisocyanate, it is preferred to employ a catalyst. A number of catalysts known to the skilled artisan may be used for this purpose. Such catalysts include, but are not limited to, an organo tin catalyst such as dibutyl tin diacetate, dibutyl tin di-2-ethylhexoate, dibutyl tin dilaurate, dibutyl tin oxide, and the like. Tertiary amines, such as triethylamine, tributylamine, triethylene-diamine tripropylamine, and the like may also be used. Mixtures of the above catalysts may be used. The catalyst may be used in various suitable amounts, preferably between about 0.005 and about 0.50 percent based on the weight of the component containing active hydrogens and the diisocyanate.

The reaction between the component containing reactive hydrogens and the diisocyanate forms a isocyanate-containing intermediate. The isocyanate-containing intermediate is then reacted with any of the diisocyantes described herein to form a polycarbodiimide. The latter reaction described above is preferably carried out in the presence of a catalyst. Suitable catalysts which may be used include, for example, those described in U.S. Pat. No. 5,008,363; the disclosure of which is incorporated herein by reference in its entirety. Particularly useful classes of carbodiimide-forming catalysts are the phospholene-1-oxides and phosphoslene-1-sulfides. Representative compounds within these classes are triphenyl phosphine; 3-methyl-1-phenyl-3-phospholine 1-oxide; 1-ethyl-phenyl-3-phospholine 1-oxide; 3-(4-methyl-3-pentynyl)-1-phenyl-3-phospholine 1-oxide; 3-chloro-1-phenyl-3-phospholine 1-oxide; 1,3-diphenyl-3-phospholine 1-oxide; 1-ethyl-3-phospholine 1-sulfide; 1-phenyl-3-phospholine 1-sulfide; and 2-phenyliso-phosphindoline 2-oxide; 1-phenyl-2-phospholene 1-oxide; 3-methyl-phenyl-2-phospholene 1-oxide; 1-phenyl-2-phospholene 1-sulfide; 1-ethyl-2-phospholene 1-oxide; 1-ethyl-3-methyl-2-phospholene 1-oxide; and 1-ethyl-3-methyl-2-phospholene 1-oxide. Other isomeric phospholenes corresponding to all the above-named compounds also can be used. Mixtures of any of the above may be used. The catalyst may be used in various suitable amounts, preferably from about 0.005 to about 10 percent based on the weight of the reactants, more preferably from about 0.02 to about 5 weight percent, and most preferably from about 0.03 to about 2 weight percent.

A vinyl monomer may also be included as a diluent with the polycarbodiimide and the unsaturated and saturated resins. Suitable monomers may include those such as, for example, styrene and styrene derivatives such as alpha-methyl styrene, p-methyl styrene, divinyl benzene, divinyl toluene, ethyl styrene, vinyl toluene, tert-butyl styrene, monochloro styrene, dichloro styrene, vinyl benzyl chloride, fluorostyrene, and alkoxystyrenes (e.g., paramethoxy styrene). Also, toluene, xylene, chlorobenzene, chloroform, tetrahydrofuran, ethyl acetate, isopropyl acetate, butyl acetate, butyl phthalate, acetone, methyl cellosolve acetate, cellosolve acetate, butyl cellosolve, methyl ethyl ketone, diethyl ketone, and cyclohexanone may be used. Other monomers which may be used include, for example, diallyl phthalate, hexyl acrylate, octyl acrylate, octyl methacrylate, diallyl itaconate, diallyl maleate, hydroxyethyl acrylate, hydroxyethyl methacrylate, hydroxypropyl acrylate, hydroxypropyl methacrylate, and mixtures thereof.

Any suitable polyfunctional acrylate may be used in the resin composition, including those described, for example, in U.S. Pat. No. 4,916,023 to Kawabata et al., the disclosure of which is incorporated by reference herein in its entirety. Such compounds include ethylene glycol dimethacrylate, butanediol dimethacrylate, hexanediol dimethacrylate, ethoxylated trimethylolpropane triacrylate, trimethylolpropane tri(meth)acrylate, trimethylolpropane triacrylate, trimethylolmethane tetramethacrylate, pentaerythritol tetramethacrylate, dipentaerythritol tetramethacrylate, dipentaerythritol pentamethacrylate, dipentaerythritol hexamethacrylate, ethoxylated polyhydric phenol diacrylates and dimethacrylates containing from 1 to 30 ethylene oxide units per OH group in the phenol, propoxylated polyhyric phenol diacrylates and dimethacrylates containing from 1 to 30 propylene oxide groups per OH groups in the phenol. Examples of some useful di- and polyhydric phenols include catechol; resorcinol; hydroquinone; 4,4'-biphenol; 4,4'-ispropylidenebis(o-cresol); 4,4'-isopropylidenebis(2-phenyl phenol); alkylidenediphenols such as bisphenol "A"; pyrogallol; phloroglucinol; naphthalene diols; phenol; formaldehyde resins; resorcinol/formaldehyde resins; and phenol/resorcinol/formaldehyde resins. Mixtures of the above di-and polyacrylates may also be employed.

The vinyl monomers and polyfunctional acrylates may be used in varying amounts, preferably from about 20 to 50 based on the weight of the components which may be dissolved therein, and more preferably from about 30 to 45 weight percent.

The method of thickening a resin may be carried out using known equipment. Typically, for example, a resin containing active hydrogens is placed in a vessel, mixing tank, or other reactor along with a catalyst that will be mixed for a period lasting from about 5 to about 20 minutes. Subsequently, a polycarbodiimide which is present (typically dissolved) in an organic diluent is added to the above resin and is allowed to mix therein for a period lasting typically from about 3 to about 15 minutes. In general, the reactive mixture of resin containing active hydrogens and polycarbodiimide is applied to a surface of a substrate and the resin containing active hydrogens and the polycarbodiimide become chemically bound. An alternative way of mixing the resin containing active hydrogens and the polycarbodiimide may be accomplished by using a self balancing internal mix chopper system made commercially available from Magnum Industries from Clearwater, Fla.

The reactive mixture includes an initiator to facilitate curing of the chemically bound resin and polycarbodiimide. The initiator is typically added to the reactive mixture prior to the thickening of the resin. An example of an initiator is an organic peroxide compound. Exemplary organic peroxides that may be used include, for example, cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bix(tert-butylperoxide) hexane; 2,5-dimethyl-2,5-bis(tert-butylperoxy)hexyne; bix (tert-butylperoxyisopropyl)benzene; ditert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy)butyrate; ethyl-3,3-di(tert-butylperoxy)-butyrate; t-butyl peroxy-neodecanoate; di-(4-5-butyl-cyclohexyl)-peroxydicarbonate; lauryl peroxyde; 2,5-dimethyl-2,5-bis(2-ethyl-hexanoyl peroxy) hexane; t-amyl peroxy-2-ethylhexanoate; 2,2'-azobis(2-methylpropionitrile); 2,2'-azobis(2,4-methlbutanenitrile); and the like. Mixtures of any of the above may be used. The initiator is preferably employed in an amount from about 1 to 2.5 percent based on the weight of the thickened resin, more preferably from about 1 to 1.5 percent by weight, and most preferably from about 1 to 1.25 percent by weight.

Suitable initiators used in curing the thickened resin may also encompass photoinitiators which may be activated upon exposure to a source of energy such as infrared, visible, or ultraviolet radiation. Examples of suitable photoinitiators include, but are not limited to, an aliphatic or aromatic diketone and a reducing agent (e.g., benzil and dimethyl benzyl amine); vicinal polyketaldonyl compounds (e.g., diacetyl benzil and benzil ketal); a-carbonyl alcohols (e.g., benzoin); acyloin ethers (e.g., benzoin methyl ether); poly-nuclear quinones (e.g., 9,10-antraquinone), and benzophenone. Preferably, the amount of photoinitiator ranges from about 0.005 to 5 percent based on the weight of the thickened resin. Suitable commercial photoinitiators include those available from Ciba-Geigy Corporation sold under the tradenames Irgacure 500, Irgacure 369, Irgacure 1700, Darocur 4265, and Irgacure 819. It should be appreciated that other commercial photoinitiators may be used for the purposes of the invention.

Suitable curing accelerators or promoters may also be used and include, for example, cobalt naphthanate, cobalt octoate, N,N-dimethyl aniline, N,N-dimethyl acetamide, and N,Ndimethyl p-toluidine. Mixtures of the above may be used. The curing accelerators or promoters are preferably employed in amounts from about 0.05 to about 1.0 percent by weight, more preferably from about 0.1 to 0.5 percent by weight, and most preferably from about 0.1 to 0.3 percent by weight of the thickened resin.

Additional additives known by the skilled artisan may be employed in the thickened resin composition of the present invention including, for example, paraffins, fatty acids, fatty acid derivatives, lubricants, and shrink-reducing additives. Various percentages of these additives can be used in the resin composition.

As recited herein, the invention relates to a method of lining the surfaces of substrates. For the purposes of the invention, the term "surfaces" is to be broadly construed and includes, but is not limited to, those which are typically exposed to conditions which may cause damage such as temperature fluctuations, earth movement, and the like. The substrates may be formed from a number of materials such as, but not limited to, concrete, metals, polymeric composites, and mixtures thereof. Flat and contoured surfaces may be encompassed within the scope of the invention. In one embodiment, the invention relates to lining a surface which forms a conduit. The term "conduit" is to be broadly interpreted and includes, for example, pipes. One example involves the lining of a surface which forms a conduit as described in U.S. Pat. No. 4,009,063 to Wood, the disclosure of which is incorporated herein by reference in its entirety.

Figure 2:
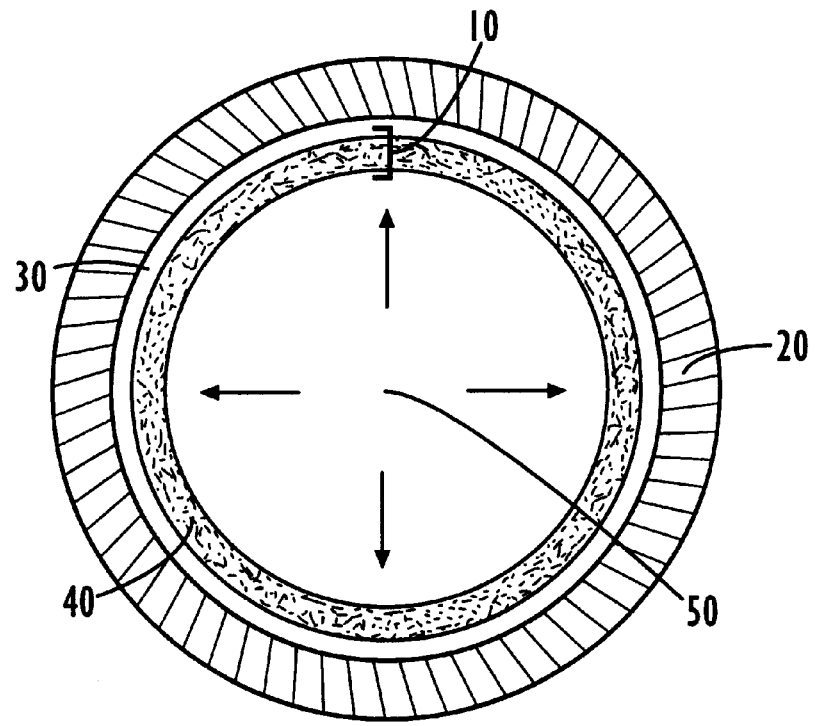
FIG. 2 illustrates a tube filled with a resin according to the invention being present inside a conduit.

In general, the resin may be applied to the conduit surface using any of the known and accepted techniques. For the purposes of the invention, the term "lining" substrate surfaces should be construed broadly, and includes employing the resin alone or in conjunction with other materials. For example, as illustrated in FIG. 1, the resin may be inserted into a tube denoted by 10. The tube depicted in this instance is defined by an outer membrane 30 and an inner membrane 40 which may contain conventional fibrous reinforcement materials such as, but not limited to, fiberglass, polyester, carbon, metal, high modulus organic fibers (e.g., aromatic polyamides, polybenzimidazoles, and aromatic polyimides), other organic fibers (e.g., polyethylene, liquid crystals, and nylon), and natural fibers. The tube 10 may be constructed out of any of a number of appropriate materials known to one skilled in the art including suitable polymeric materials, and is fabricated by conventional methods. As discussed below, since the tube 10 is made to conform to the shape and size of the conduit 20 as illustrated in FIG. 2, it is desirable that the outer membrane 30 be formed from materials which possess a certain degree of elasticity. Examples of suitable materials include, but are not limited to, polyethylene, polyvinylchloride, rubber, cellophane nitrate, neoprene, and polyester film. The dimensions of the tube may be configured in a manner such that the tube fits within a variety of conduits.

The reactive mixture may be inserted into the tube 10 using known procedures, typically involving the impregnation of membrane 40. The insertion of the reactive mixture typically taking place prior to placing the tube 10 in conduit 20. For example, the reactive mixture may be pumped or injected into tube 10 through one end or at puncture ports located at several intervals along the tube 10. Additional materials may be present along with the reactive mixture in tube 10. Specifically, tube 10 may include those materials which are typically used in conjunction with resins such as, for example, fibrous reinforcement material, woven and nonwoven fibrous sheets or mats, fillers, fire retardants, colorants, and the like. The selection of these materials is known to one who is skilled in the art.

At this point, the reactive mixture is a viscous material in tube 10, and it is allowed to thicken for 1 to 24 hours or longer to become a gel-like substance which remains flexible. Preferably, the process occurs between about 5° C. and about 60° C., and more preferably between about 10° C. and about 35° C. Tube 10 remains flexible and can allow for good control for its insertion into conduit 20.

Figure 3:
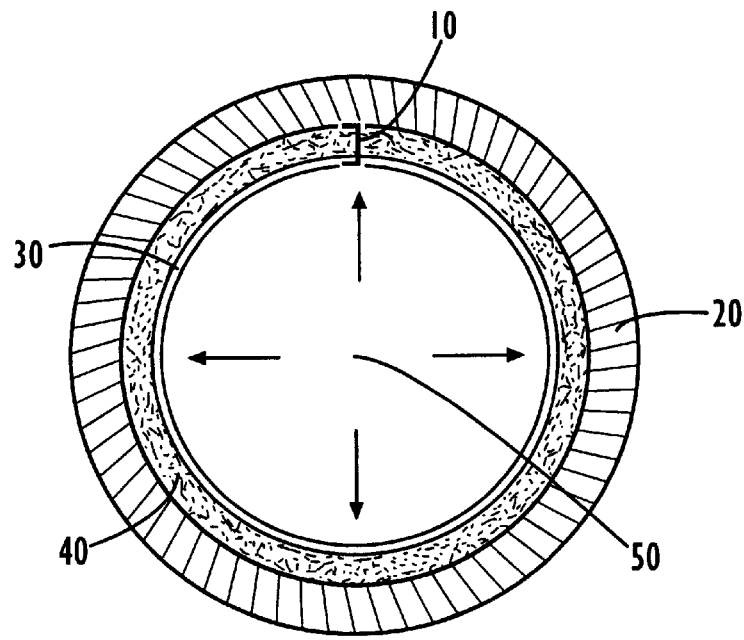
FIG. 3 illustrates a tube filled with a resin according to the invention being urged by pressure against an inner surface of a conduit.
Figure 4:
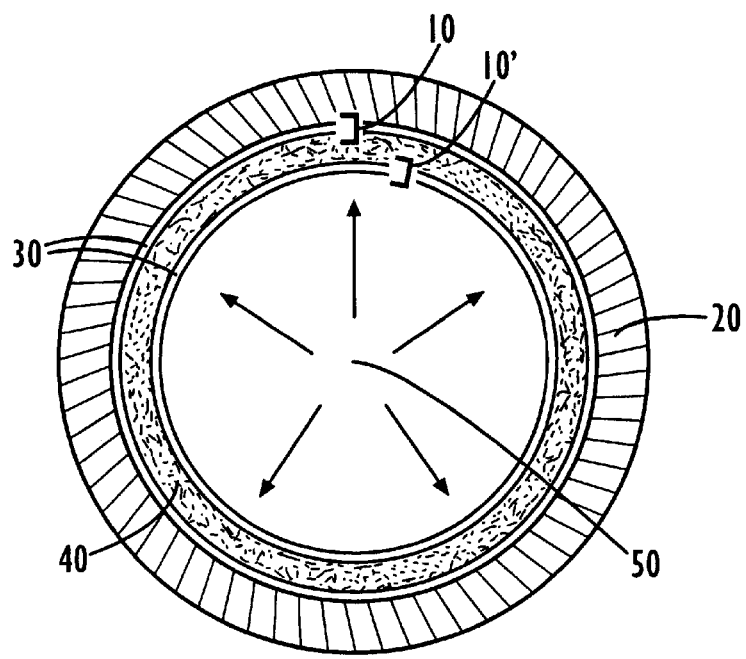
FIG. 4 illustrates a tube filled with a resin according to the invention being urged by pressure against a tube previously inserted and against an inner surface of a conduit.

The insertion of tube 10 into conduit 20 may be carried out using various techniques. For example, as shown in FIG. 2, the tube 10 may be drawn into the conduit 20 and expanded or inflated by air pressure such that it fills conduit channel 50 and conforms to the shape of conduit 20. In another embodiment, illustrated in FIG. 3, the tube 10 may be inverted during insertion into the conduit 20 using, for example, water pressure. As a result, the inner membrane 40 may contact the inner surface of conduit 20. Moreover, the tube 10 may be inserted by employing an approach which combines both of the above methods. As shown in FIG. 4, a tube 10 is drawn into the conduit 20. Next, a second tube 10' which contains a thin inner membrane 40 is inverted into the first tube 10 which is drawn into conduit 20 as described herein above.

The curing of the thickened resin which is present in tube 10 contained in conduit 20 may occur using known techniques. For example, hot air, hot water, or other means such as electricity, radiation, and the like may be employed. The temperature under which the curing takes place preferably ranges from about 40° C. to about 150° C. The cured crosslinked resin material serves to line the conduit 20. In addition to the tube described above, it should be noted that other tubes, membranes, and the like may be utilized in conjunction with tube 10 to form a multi-layer composite liner structure within conduit 20.

The following examples are provided to illustrate the present invention, and should not be construed as limiting thereof.

EXAMPLES 1–20

Polycarbodiimide Preparation Using a Neat Preparation

Examples 1–20 represent polycarbodiumides prepared by using a neat preparation which is described herein below. Table 1 lists the compositions for the polycarbodiimides.

Toluene diisocyanate is placed in a reactor and n-butanol is added at a rate to maintain the reaction temperature below 120° C. The temperature is then increased to 120° C. and maintained for thirty minutes to complete the first step of the reaction. Next, a carbodiimide forming catalyst, 3-methyl-1-phenyl-2-phospholene-1-oxide, is added and the reaction is continued at 140° C. to complete the second step of the reaction. Once a small amount of unreacted isocyanate groups remain, as detected by infrared spectroscopy, a second charge of n-butanol is added to the reaction mixture. After 15 to 60 minutes, when no unreacted isocyanate groups are detected, the temperature is decreased to 100° C.

Styrene containing an inhibitor is then added. The reaction is cooled continuously until room temperature is reached, thus completing the reaction.

Table 2 describes the resulting molecular weights (Mn and Mw) and polydispersity (D) for these examples as measured by gel permeation chromatography. Also listed are the viscosities determined by a Brookfield viscometer (LVF #3 spindle at 30 rpm) and percent solids.

EXAMPLES 21 THROUGH 27

Polycarbodiimide Preparation in the Presence of Styrene

Examples 21–27 are polycarbodiimides which are prepared in the presence of styrene. Specifically, toluene diisocyanate, styrene, and p-benzoquinone are placed in a reactor, and n-butanol is added at a rate to maintain a reaction temperature below 120° C. The temperature is then increased to 120° C. and maintained for thirty minutes to complete the first step of the reaction. Next, a carbodiimide forming catalyst, 3-methyl-1-phenyl-2-phospholene-1-oxide, is added and the reaction is continued at 140° C. to complete the second step of the reaction. Once a small amount of unreacted isocyanate groups remain, as detected by infrared spectroscopy, a second charge of n-butanol is added to the reaction. After 15 to 60 minutes, when no more unreacted isocyanate groups are detected, the temperature is decreased to 100° C. and additional styrene is added to the reaction. The reaction is cooled continuously until room temperature is reached, and thus completing the reaction.

Table 3 describes the resulting molecular weights (Mn and Mw) and polydispersity (D) as measured by gel permeation chromatography. Also listed are the viscosities determined by a Brookfield viscometer (LVF #3 spindle at 30 rpm) and percent solids.

Resins Thickened Using Polycarbodiimides

Described below are resins which have been thickened using the polycarbodiimides referred to above. All resins are available from Reichhold Chemicals, Inc., Durham, N.C. The resins are as follows. DION® 6694 is a corrosion resistant modified bisphenol fumarate. Polylite® 31612 types are unsaturated polyesters containing propylene glycol and maleic anhydride. Polylite® 31013-00 contains 2-methyl-1,3-propanediol, ethylene glycol, terephthalic acid, and maleic anhydride. Polylite® 31830-00 is an unsaturated polyester containing diethylene glycol, adipic acid, isophthalic acid and maleic anhydride. Polylite® 31506-00 is an unsaturated polyester containing propylene glycol, isophthalic acid, terephthalic acid, and maleic anhydride.

The following catalysts are used in the curing process. Superox® 46744 is a pourable, pumpable BPO dispersion available from Reichhold Chemicals, Inc., Durham, N.C. Trigonox® 21 is a t-butyl peroxy-2-ethylhexanoate catalyst available from Akzo Chemicals, Inc., Chicago, Ill.

The procedure for thickening a resin begins by placing an unsaturated polyester in a container and mixing a catalyst with the resin for five to ten minutes. The polycarbodiimide is then added and mixed for one minute. The percentage of polycarbodiimide used can be varied to achieve the desired viscosity at the required time interval. Viscosities in the following tables are measured with a Brookfield viscometer RVF#4 at 10 rpm if the reported viscosity is below 20,000 cps and with a Brookfield viscometer HBT TC spindle at 1 rpm for viscosities exceeding 20,000 cps.

Description of Data

Table 4 illustrates the chemical thickening profile of DION® 6694 using the polycarbodiimide described in Example 18. A general procedure to line a pipe is described below. FIGS. 1 and 3 illustrate the lining of the pipe. In one embodiment, unsaturated polyester resin Don® 6694 is mixed with Superox® 46744 for about 10 minutes and then the polycarbodiimide described in Example 18 is added in the amount described in Table 4. The reactive mixture is pumped into tube 10 through one end or at several puncture ports located along tube 10. The reactive mixture is allowed to thicken for 24 hours at room temperature to become a gel-like substance that remains flexible to allow for good control during insertion into conduit 20. As shown in FIG. 3, tube 10 is inverted during insertion into conduit 20 by using water pressure. As a result, inner membrane 40 is forced inside-out and contacts the inner surface of conduit 20. After inversion of tube 10, one of the ends is sealed so that water remains in the inner portion of the tube. The temperature of the water is then gradually increased to about 90° C. for about 1 to about 4 hours. At the end of this period, the impregnated tube 10 becomes a hardened material lining conduit 20.

Table 5 illustrates the chemical thickening profiles of Polylite® 31612 types using two different polycarbodiimide concentrations: (1) 8 weight percent of Example 10 and (2) 10 weight percent of Example 26. Table 6 illustrates the chemical thickening profiles of Polylite® 31013-000 at two different polycarbodiimide concentrations: (1) 8 weight percent of Example 3 and (2) 10 weight percent of Example 9. Table 7 illustrates the chemical thickening profiles for Polylite® 31013-00 and Polylite® 31830-00 blend, 75/25 weight percent respectively, using 8 weight percent of polycarbodiimides prepared in (1) Example 10 and (2) Example 18.

Table 8 illustrates two hour chemical thickening profiles using Polylite® 31506-00 with polycarbodiimides described in Examples 3, 4, 6, and 7. Table 9 illustrates chemical thickening profiles using Polylite® 31506-00 with polycarbodjimides described in Examples 3, 4, 5, 8, 9, 16, 17, 19, and 20. Table 10 illustrates chemical thickening profiles for Polylite® 31506-00 containing styrene-prepared polycarbodiimides described in Examples 21 and 25. Table 11 illustrates the effect of polycarbodiimide concentration on the chemical thickening profile using Polylite® 31506-00 with the polycarbodiimide prepared in Example 9. Table 12 illustrates batch-to-batch variation with polycarbodiimides prepared in Examples 7 and 18 and two batches of Polylite® 31506-00: A and B. Table 13 details the effect of temperature on the chemical thickening profile of Polylite® 31506-00 and the polycarbodiimide prepared in Example 8.

Comparison of Chemical Thickening Processes

Table 14 compares four different chemical thickening systems. The polycarbodiimide system according to the invention was prepared by mixing 2 g of Superox® 46744 with 180 g of Polylite® 31612-10 for two minutes. The polycarbodiimide prepared in Example 18 was then added in the amount of 20 g and mixed for one minute.

A magnesium oxide system was prepared by mixing 2 g of Superox® 46744 with 200 g Polylite® 31612-10 for two minutes. Maglite D® (C. P. Hall Company, Chicago, Ill.) in the amount of 8 g was then added and mixed for one minute.

A combination magnesium oxide and polycarbodiimide system was prepared by mixing 2 g of Superox® 46744 with 190 g of Polylite® 31612-10 for two minutes. Maglite D® was then added in the amount of 6 g as well as 10 g of Example 18. The material was mixed for one minute.

A Rubinate M® (ICI, Sterling Heights, Mich.) system was made by mixing 2 g of Superox® 46744 with 200 g of Polylite® 31612-10 for two minutes. Rubinate M® in the amount of 10 g and 1 g of dibutyl tin dilaurate were added and mixed for one minute.

TABLE 1

General Polycarbodiimide Production

| Raw Material | Total Charge Weight Percent | |
|---|---|---|
| | Neat Preparation | Styrene Preparation |
| Toluene diisocyanate | 48.78 | 48.78 |
| Styrene | 0 | 20.00 |
| p-benzoquinone | 0.0112–0.0300 | 0.0300 |
| n-butanol | 13.835 | 13.835 |
| Phospholene oxide* | 0.03–0.05 | 0.03–0.05 |
| Styrene | 37.31–37.34 | 17.31–17.33 |

*3-methyl-1-phenyl-2-phospholene-1-oxide

TABLE 2

Polycarbodiimide Production
Neat Preparation

| | Molecular Weight Data | | | Physical Properties | | n-Butanol Charge | |
|---|---|---|---|---|---|---|---|
| Example | Mn | Mw | D | Viscosity cps | Percent Solids | Percent 1st Add | Percent 2nd Add |
| 1 | 1570 | 23600 | 15 | 260 | 58.1 | 86.7 | 13.3 |
| 2 | 1650 | 30300 | 18 | 310 | 57.6 | 86.7 | 13.3 |
| 3 | 1460 | 14400 | 10 | 364 | 57.1 | 86.7 | 13.3 |
| 4 | 1440 | 13100 | 9 | 324 | 57.5 | 86.7 | 13.3 |
| 5 | 1430 | 10500 | 7.4 | 204 | 56.2 | 86.7 | 13.3 |
| 6 | 1370 | 11500 | 8.4 | 420 | 57.4 | 95 | 5 |
| 7 | 1210 | 7240 | 6.0 | 224 | 57.2 | 97.5 | 2.5 |
| 8 | 1110 | 4280 | 3.8 | 180 | 58.6 | 98.5 | 1.5 |
| 9 | 1210 | 5780 | 4.8 | 228 | 59.2 | 97.5 | 2.5 |
| 10 | 1500 | 9200 | 6.1 | 320 | 59.2 | 97.5 | 2.5 |
| 11 | 1270 | 6310 | 5 | 328 | 59.6 | 97.5 | 2.5 |
| 12 | 1290 | 5960 | 4.6 | 284 | 59.5 | 97.5 | 2.5 |
| 13 | 1210 | 5070 | 4.2 | 260 | 59.8 | 97.5 | 2.5 |
| 14 | 1210 | 5040 | 4.2 | 280 | 59.2 | 97.5 | 2.5 |
| 15 | 1170 | 4370 | 3.7 | 240 | 59.5 | 97.5 | 2.5 |
| 16* | 1190 | 5040 | 4.2 | 380 | 59.4 | 97.5 | 2.5 |
| 17 | 1420 | 9420 | 6.6 | 480 | 59.4 | 97.5 | 2.5 |
| 18 | 1440 | 9230 | 6.4 | 560 | 59.2 | 97.5 | 2.5 |
| 19 | 1200 | 4680 | 3.9 | 344 | 58.5 | 97.5 | 2.5 |
| 20 | 1200 | 5800 | 4.8 | 440 | 58.6 | 97.5 | 2.5 |

*Example 16 is a composite of Examples 11 through 15.

TABLE 3

Polycarbodiimide Production
Styrene Preparation

| | Molecular Weight Data | | | Physical Properties | | n-Butanol Charge | |
|---|---|---|---|---|---|---|---|
| Example | Mn | Mw | D | Viscosity cps | Percent Solids | Percent 1st Add | Percent 2nd Add |
| 21 | 1170 | 4630 | 3.9 | 268 | 60.2 | 90 | 10 |
| 22 | 1350 | 10400 | 7.7 | 344 | 61.6 | 90 | 10 |
| 23 | 1470 | 14500 | 9.9 | 400 | 61.4 | 90 | 10 |
| 24 | 1530 | 15600 | 10 | 432 | 60.4 | 90 | 10 |
| 25 | 1230 | 5490 | 4.5 | 392 | 60.9 | 100 | 0 |
| 26 | 1100 | 5620 | 5.1 | 336 | 59.8 | 98.5 | 1.5 |
| 27 | 1140 | 5640 | 5 | 480 | 61.3 | 98 | 2 |

TABLE 4

Chemical Thickening Profile
DION® 6694

| Blend Component | Weight Percent |
|---|---|
| 6694 | 92 |
| Example 18 | 8 |
| Superox® 46744 | 1 g/100 g mix |

| Time from Mixing Minutes | Viscosity cps |
|---|---|
| 0 | 1000 |
| 15 | 1660 |
| 30 | 3120 |
| 45 | 6640 |
| 60 | 14400 |
| 90 | $1.44 \times 10^6$ |
| 120 | $2.08 \times 10^6$ |
| 24 hours | $3.86 \times 10^6$ |

Gel Time Data

| Gel time at 90° C. | 29.5 min |
|---|---|
| Peak exotherm | 205.7° C. |
| Total time to peak | 47.4 min |

TABLE 5

Chemical Thickening Profiles
Polylite® 31612 Types

| Blend Component | Weight Percent |
|---|---|
| 31612-10 | 92 |
| Example 10 | 8 |
| Trigonox® 21 | 1 g/100 g mix |

| Time from Mixing Minutes | Viscosity cps |
|---|---|
| 0 | 1200 |
| 15 | 2150 |
| 30 | 3300 |
| 45 | 4600 |
| 60 | 5700 |
| 90 | 7700 |
| 120 | 9100 |
| 150 | 10400 |
| 180 | 10800 |
| 24 hours | 13140 |

Gel Time Data

| Gel time at 90° C. | 6.8 min |
|---|---|
| Peak exotherm | 221.0° C. |
| Total time to peak | 9.0 min |

| Blend Component | Weight Percent |
|---|---|
| 31612-25 | 90 |
| Example 26 | 10 |

| Time from Mixing Minutes | Viscosity cps |
|---|---|
| 0 | 3600 |
| 2 | 4480 |
| 4 | 5240 |
| 6 | 6310 |
| 8 | 7770 |
| 10 | 9620 |
| 15 | 19400 |
| 20 | 30000 |
| 25 | 70000 |
| 45 | $6.44 \times 10^6$ |
| 120 | $6.72 \times 10^6$ |

TABLE 6

Chemical Thickening Profiles
Polylite ® 31013-00

| Blend Component | Weight Percent |
| --- | --- |
| 31013-00 | 69 |
| Styrene | 23 |
| Example 3 | 8 |

| Time from Mixing Minutes | Viscosity cps |
| --- | --- |
| 0 | 500 |
| 2 | 540 |
| 4 | 600 |
| 6 | 660 |
| 8 | 720 |
| 10 | 800 |
| 15 | 1000 |
| 20 | 1200 |
| 25 | 1440 |
| 30 | 1640 |
| 45 | 2420 |
| 60 | 3280 |
| 70 | 3880 |
| 80 | 4500 |
| 90 | 5280 |
| 100 | 5940 |
| 110 | 6500 |
| 120 | 6920 |
| 270 | 12320 |
| 360 | 15660 |

| Blend Component | Weight Percent |
| --- | --- |
| 31013-00 | 67.5 |
| Styrene | 22.5 |
| Example 9 | 10 |

| Time from Mixing Minutes | Viscosity cps |
| --- | --- |
| 0 | 740 |
| 15 | 1200 |
| 30 | 2000 |
| 45 | 2880 |
| 60 | 4560 |
| 90 | 8040 |
| 120 | 14300 |
| 20 hours | $1.96 \times 10^6$ |

TABLE 7

Chemical Thickening Profiles
Polylite ® 31013-00 and Polylite ® 31830-00 Blend

| Blend Component | Weight Percent |
| --- | --- |
| 31013-00 | 69 |
| 31830-00 | 23 |
| Example 10 | 8 |
| Trigonox ®21 | 1 g/100 g mix |

| Time from Mixing Minutes | Viscosity cps |
| --- | --- |
| 0 | 760 |
| 15 | 1100 |
| 30 | 1500 |
| 45 | 1960 |
| 60 | 2480 |
| 90 | 3340 |
| 120 | 4160 |
| 24 hours | 8540 |

| Gel Time Data | |
| --- | --- |
| Gel Time at 90° C. | 6.3 min |
| Peak exotherm | 236.7° C. |
| Total time to peak | 15.7 min |

| Blend Component | Weight Percent |
| --- | --- |
| 31013-00 | 69 |
| 31830-00 | 23 |
| Example 18 | 8 |

| Time from Mixing Minutes | Viscosity cps |
| --- | --- |
| 0 | 980 |
| 15 | 1540 |
| 30 | 2260 |
| 45 | 3280 |
| 60 | 4060 |
| 90 | 5580 |
| 120 | 6860 |
| 24 hours | 13200 |

TABLE 8

Chemical Thickening Profiles
Polylite ® 31506-00

| Blend Component | Weight Percent | Weight Percent | Weight Percent | Weight Percent |
|---|---|---|---|---|
| 31506-00 | 92 | 92 | 92 | 92 |
| Polycarbodiimide | 8 | 8 | 8 | 8 |

| Polycarbodiimide Time from Mixing Minutes | Example 3 Viscosity cps | Example 4 Viscosity cps | Example 6 Viscosity cps | Example 7 Viscosity cps |
|---|---|---|---|---|
| 0 | 900 | 850 | 700 | 700 |
| 2 | 980 | 920 | 800 | 800 |
| 4 | 1080 | 1020 | 850 | 800 |
| 6 | 1160 | 1060 | 900 | 800 |
| 8 | 1260 | 1200 | 1000 | 825 |
| 10 | 1360 | 1300 | 1000 | 850 |
| 15 | 1700 | 1600 | 1150 | 1100 |
| 20 | 2240 | 2120 | 1350 | 1200 |
| 25 | 3080 | 2600 | 1600 | 1400 |
| 30 | 4280 | 3450 | 18000 | 1600 |
| 40 | 7020 | 6300 | — | — |
| 45 | — | — | 300 | 2400 |
| 50 | 240000 | 50000 | — | — |
| 60 | $1.12 \times 10^6$ | $1.44 \times 10^6$ | 5150 | 3650 |
| 70 | $1.96 \times 10^6$ | $2.16 \times 10^6$ | 7400 | 4800 |
| 80 | $2.48 \times 10^6$ | $2.60 \times 10^6$ | 10950 | 7200 |
| 90 | $3.08 \times 10^6$ | $2.92 \times 10^6$ | >100000 | 8600 |
| 120 | $4.40 \times 10^6$ | $4.12 \times 10^6$ | — | — |

TABLE 9

Chemical Thickening Profiles
Polylite ® 31506-00

| Blend Component | Weight Percent | Weight Percent | Weight Percent | Weight Percent | Weight Percent |
|---|---|---|---|---|---|
| 31506-00 | 92 | 92 | 92 | 92 | 92 |
| Polycarbodiimide | 8 | 8 | 8 | 8 | 8 |

| Polycarbodiimide Time from Mixing Minutes | Example 3 Viscosity cps | Example 4 Viscosity cps | Example 5 Viscosity cps | Example 8 Viscosity cps | Example 9 Viscosity cps |
|---|---|---|---|---|---|
| 0 | — | — | — | 700 | 700 |
| 15 | 1640 | 1686 | 1608 | 1080 | 1060 |
| 30 | 10 | 3390 | 2780 | 1760 | 1640 |
| 45 | — | — | — | 2560 | 2620 |
| 60 | 100000 | $1.34 \times 10^6$ | 42400 | 3660 | 4020 |
| 75 | — | — | — | 5940 | 5800 |
| 90 | $2.40 \times 10^6$ | $4.00 \times 10^6$ | $2.40 \times 10^6$ | 8720 | 11560 |
| 120 | — | — | — | 40000 | 120000 |
| 150 | $4.00 \times 10^6$ | $5.20 \times 10^6$ | $4.08 \times 10^6$ | $1.28 \times 10^6$ | $1.80 \times 10^6$ |
| 24 Hours | $6.70 \times 10^6$ | $6.20 \times 10^6$ | $8.60 \times 10$ | $4.84 \times 10^6$ | $5.52 \times 10^6$ |

| Blend Component | Weight Percent | Weight Percent | Weight Percent | Weight Percent |
|---|---|---|---|---|
| 31506-00 | 92 | 92 | 92 | 92 |
| Polycarbodiimide | 8 | 8 | 8 | 8 |

| Polycarbodiimide Time from Mixing Minutes | Example 16 Viscosity cps | Example 17 Viscosity cps | Example 19 Viscosity cps | Example 20 Viscosity cps |
|---|---|---|---|---|
| 0 | 780 | 720 | 750 | 700 |
| 15 | 1000 | 1040 | 1000 | 1000 |
| 30 | 1260 | 1460 | 1400 | 1500 |
| 45 | 1740 | 1940 | 1900 | 2000 |
| 60 | 2200 | 2600 | 2450 | 2800 |
| 90 | 3280 | 4320 | 4200 | 4100 |
| 120 | 4600 | 6300 | 5500 | 4800 |
| 150 | — | 10780 | — | — |
| 24 Hours | $1.00 \times 10^6$ | $1.48 \times 10^6$ | $2.40 \times 10^6$ | $2.88 \times 10^6$ |

TABLE 10

Chemical Thickening Profiles: Styrene Preparations Polylite ® 31506-00

| Blend Component | Weight Percent | Weight Percent |
|---|---|---|
| 31506-0 | 92 | 92 |
| Polycarbodiimide | 8 | 8 |

| | Polycarbodiimide | |
|---|---|---|
| Time from Mixing Minutes | Example 21 Viscosity cps | Example 25 Viscosity cps |
| 0 | 760 | 860 |
| 2 | 840 | 900 |
| 4 | 880 | 940 |
| 6 | 920 | 980 |
| 8 | 1000 | 1020 |
| 10 | 1060 | 1060 |
| 15 | 1300 | 1200 |
| 20 | 1600 | 1380 |
| 25 | 1860 | 1520 |
| 30 | 2500 | 1720 |
| 45 | 4780 | 2460 |
| 60 | 12800 | 3240 |
| 70 | $0.48 \times 10^6$ | 4740 |
| 80 | $2.84 \times 10^6$ | 5620 |
| 90 | $4.16 \times 10^6$ | 7540 |
| 120 | — | 16000 |
| 240 | $6.64 \times 10^6$ | — |
| 24 Hours | — | $3.76 \times 10^6$ |

TABLE 11

Chemical Thickening Profiles: Effect of Polycarbodiimide Concentration

| Blend Component | Weight Percent | Weight Percent | Weight Percent | Weight Percent |
|---|---|---|---|---|
| 31506-00 | 96 | 95 | 94 | 93 |
| Example 9 | 4 | 5 | 6 | 7 |
| Time from Mixing Minutes | Viscosity cps | Viscosity cps | Viscosity cps | Viscosity cps |
| 0 | 700 | 640 | 660 | 700 |
| 15 | 900 | 940 | 1120 | 1300 |
| 30 | 1200 | 1440 | 2100 | 3000 |
| 45 | 1600 | 2420 | 4360 | 120000 |
| 60 | 1900 | 3440 | — | 880000 |
| 90 | 2800 | 8260 | $1.12 \times 10^6$ | $1.52 \times 10^6$ |
| 120 | 3800 | 80000 | $1.24 \times 10^6$ | $1.84 \times 10^6$ |

TABLE 12

Chemical Thickening Profiles Batch to Batch Variation

| Blend Component | Weight Percent | Weight Percent | Weight Percent | Weight Percent |
|---|---|---|---|---|
| 31506-00 | 92 | 92 | 92 | 92 |
| Polycarbodiimide | 8 | 8 | 8 | 8 |
| | Example 7 | | Example 18 | |
| 31506-00 Batch Times from Mixing Minutes | A Viscosity cps | B Viscosity cps | A Viscosity cps | B Viscosity cps |
| 0 | 800 | 1400 | 700 | 1560 |
| 15 | 1100 | 2150 | 1000 | 2880 |
| 30 | 1640 | 3550 | 1300 | 5460 |
| 45 | 2460 | 5600 | 1900 | 10240 |
| 60 | 4120 | 9600 | 2500 | 20000 |
| 90 | 8020 | 80000 | 3900 | $2.04 \times 10^6$ |
| 120 | 120000 | $2.04 \times 10^6$ | 5800 | $3.28 \times 10^6$ |
| 150 | $1.24 \times 10^6$ | — | 8200 | — |
| 24 hours | $4.96 \times 10^6$ | $3.00 \times 10^6$ | $3.44 \times 10^6$ | $3.60 \times 10^6$ |

TABLE 13

Chemical Thickening Profiles—Effect of Temperature

| Blend Component | Weight Percent | Weight Percent | Weight Percent |
|---|---|---|---|
| 31506-00 | 92 | 92 | 92 |
| Example 8 | 8 | 8 | 8 |
| Time from Mixing minutes | Viscosity cps 50° F. | Viscosity cps 77° F. | Viscosity cps 90° F. |
| 0 | 600 | 600 | 600 |
| 15 | 1300 | 900 | 920 |
| 30 | 1700 | 1300 | 1400 |
| 45 | 2100 | 1900 | 2000 |
| 60 | 2600 | 2600 | 3700 |
| 90 | 3100 | 4000 | 6200 |
| 120 | 3800 | 5800 | 13600 |
| 150 | 4900 | 8600 | 80000 |
| 24 hours | $1.16 \times 10^6$ | $1.14 \times 10^6$ | $0.68 \times 10^6$ |

TABLE 14

Comparison of Chemical Thickening Processes

| Blend Component | Weight Percent | Weight Percent | Weight Percent | Weight Percent |
|---|---|---|---|---|
| 31612-10 | 90 | 100 | 95 | 100 |
| Example 18 | 10 | — | 5 | — |
| Magnate D | — | 4 g/100 g resin | 3 g/100 g mix | — |
| Rubinate M | — | — | — | 5 g/100 g resin |
| Dibutyl tin dilaurate | — | — | — | 0.5 g/100 g resin |
| Superox ® 46744 | 1 g/100 g mix | 1 g/100 g resin | 1 g/100 g mix | 1 g/100 g resin |
| Time from Mixing Minutes | Viscosity Cps | Viscosity Cps | Viscosity cps | Viscosity cps |
| 0 | 800 | 1140 | 900 | 620 |
| 15 | 1200 | 1140 | 1800 | 740 |
| 30 | 2400 | 1120 | 2500 | 980 |
| 45 | 4600 | 1200 | 3100 | 1300 |
| 60 | 5700 | 1460 | 41000 | 1920 |
| 60 | 5700 | 1460 | 4000 | 1920 |
| 90 | 7700 | 2480 | 6300 | 3720 |
| 120 | 9100 | 5200 | 10400 | 8380 |
| 24 hours | $4.22 \times 10^6$ | $3.84 \times 10^6$ | $3.20 \times 10^6$ | $7.60 \times 10^6$ |
| Get Time Data | | | | |
| Gel time at 90° C. | 18.1 min | 14.6 min | 13.2 min | 15.0 min |
| Peak exotherm | 215.9° C. | 238.5° C. | 226.4° C. | 200.8° C. |
| Total time to peak | 27.8 min | 19.5 min | 18.0 min | 22.0 min |

That which is claimed:

1. A method of lining a surface of a substrate, said method comprising the steps of:
providing a reactive mixture which comprises (1) a resin containing active hydrogens; (2) a polycarbodiimide; and (3) an organic diluent;
reacting the resin containing active hydrogens and the polycarbodiimide to chemically bind the resin and the polycarbodiimide;
applying the chemically bound resin and polycarbodiimide to the surface of the substrate; and
curing the chemically bound resin and polycarbodiimide in the presence of a initiator to form a cured resin material which lines the surface of the substrate.

2. The method according to claim 1, wherein the substrate is a conduit.

3. The method according to claim 1, wherein the reactive mixture comprises greater than about 5 percent by weight of polycarbodiimide.

4. The method according to claim 1, wherein the resin containing active hydrogens is selected from the group consisting of saturated polyester resins, unsaturated polyester resins, vinyl ester resins, polyurethane resins, and mixtures thereof.

5. The method according to claim 1, wherein the organic diluent is selected from the group consisting of toluene, xylene, chlorobenzene, chloroform, tetrahydrofuran, ethyl acetate, isopropyl acetate, butyl acetate, butyl phthalate, acetone, methyl cellosolve acetate, cellosolve acetate, butyl cellosolve, methyl ethyl ketone, diethyl ketone, cyclohexanone, styrene, alphamethylstyrene, p-methyl styrene, divinyl benzene, vinyl toluene, divinyl toluene, ethyl styrene, tert-butyl styrene, monochloro styrene, dichloro styrene, vinyl cyclohexane, vinyl cyclopentane, vinyl toluene, vinyl anthracenes, 3-vinyl benzyl chloride, 4-vinyl biphenyl, 4-vinyl-1-cyclohexene, vinyl cyclooctane, 2-vinyl naphthalene, 5-vinyl-2-norbornene, 1-vinylimidazole, 2-vinyl pyridine, 4-vinyl pyridine, 1-vinyl-2-pyrrolidinone, 9-vinyl carbazole, ethylene glycol dimethacrylate, butanediol dimethacrylate, hexanediol dimethacrylate, and mixtures thereof.

6. The method according to claim 1, wherein the organic diluent comprises a polyfunctional acrylate component.

7. The method according to claim 1, wherein the polycarbodiimide is formed from a reaction between an isocyanate-containing intermediate and a diisocyante.

8. The method according to claim 7, wherein the isocyanate-containing intermediate is formed from a reaction between a component containing active hydrogens and a diisocyanate.

9. The method according to claim 8, wherein the component containing active hydrogens is selected from the group consisting of alcohols, amines, thiols, phenols, silanol, —P—OH, —P—H, and mixtures thereof.

10. The method according to claim 8, wherein the component containing active hydrogens is an alcohol.

11. The method according to claim 1, wherein the initiator is an organic peroxide selected from the group consisting of cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bis(tert-butylperoxide)hexane; 2,5-dimethyl-2,5-bis(tert-butylperoxy)hexyne; bis(tert-butylperoxyisopropyl) benzene; di(tert-butyl peroxide); 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tertbutylperoxy)butane; n-butyl-4,4-di (tert-butylperoxy)valerate; ethyl-3,3-di-(tertamylperoxy) butyrate; ethyl-3,3-di(tert-butylperoxy)-butyrate; t-butyl peroxyneodecanoate; di-(4-5-butyl-cyclohexyl)-peroxydicarbonate; lauryl peroxide; 2,5-dimethyl-2,5-bis(2-ethyl-hexanoyl peroxy) hexane; t-amyl peroxy-2-ethylhexanoate; 2,2'-azobis(2-methyl-propionitrile); 2,2'-azobis(2,4-methylbutanenitrile); and mixtures thereof.

12. The method according to claim 1, wherein said step of curing the chemically bound resin and polydicarbodiimide in the presence of an initiator to form a cured resin material is carried out in the presence of a promoter.

13. The method according to claim 1, wherein said reactive mixture further comprises fibrous reinforcement material.

14. The method according to claim 13, wherein the fibrous reinforcement material is selected from the group consisting of fiberglass, polyester, carbon, metal, organic fibers, and mixtures thereof.

15. The method according to claim 1, wherein said step of reacting the resin containing active hydrogens and the polycarbodiimide to chemically bind the resin and the polycarbodiimide is carried out at a temperature ranging from about 5° C. to about 60° C.

16. The method according to claim 1, wherein said step of curing the chemically bound resin and polydicarbodiimide in the presence of an initiator to form a cured resin material is carried out at a temperature ranging from about 40° C. to about 150° C.

17. A method of lining a surface of a conduit comprising:
providing a reactive mixture which comprises (1) a resin containing active hydrogens; (2) a polycarbodiimide; and (3) an organic diluent;
inserting the reactive mixture into a tube, the tube being defined by an inner membrane and an outer membrane;
reacting the resin containing active hydrogens and the polycarbodiimide to chemically bind the resin and the polycarbodiimide;
inserting the tube into a conduit having an inner surface;
applying pressure to the tube such that the tube comes in contact with the inner surface of the conduit to line the inner surface of the conduit; and
curing the chemically bound resin and polycarbodiimide in the presence of an initiator to form a cured resin material.

18. The method according to claim 17, wherein the reactive mixture comprises greater than about 5 percent by weight of polycarbodiimide.

19. The method according to claim 17, wherein the resin containing active hydrogens is selected from the group consisting of saturated polyester resins, unsaturated polyester resins, vinyl ester resins, polyurethane resins, and mixtures thereof.

20. The method according to claim 17, wherein the organic diluent is selected from the group consisting of toluene, xylene, chlorobenzene, chloroform, tetrahydrofuran, ethyl acetate, isopropyl acetate, butyl acetate, butyl phthalate, acetone, methyl cellosolve acetate, cellosolve acetate, butyl cellosolve, methyl ethyl ketone, diethyl ketone, cyclohexanone, styrene, alphamethylstyrene, p-methyl styrene, divinyl benzene, vinyl toluene, divinyl toluene, ethyl styrene, tert-butyl styrene, monochloro styrene, dichloro styrene, vinyl cyclohexane, vinyl cyclopentane, vinyl toluene, vinyl anthracenes, 3-vinyl benzyl chloride, 4-vinyl biphenyl, 4-vinyl-1-cyclohexane, vinyl cyclooctane, 2-vinyl naphthalene, 5-vinyl-2-norbornene, 1-vinylimidazole, 2-vinyl pyridine, 4-vinyl pyridine, 1-vinyl-2-pyrrolidinone, 9-vinyl carbazole, ethylene glycol dimethacrylate, butanediol dimethacrylate, hexanediol dimethacrylate, and mixtures thereof.

21. The method according to claim 17, wherein the organic diluent comprises a polyfunctional acrylate component.

22. The method according to claim 17, wherein the polycarbodiimide is formed from a reaction between an isocyanate-containing intermediate and a diisocyante.

23. The method according to claim 22, wherein the isocyanate-containing intermediate is formed from a reaction between a component containing active hydrogens and a diisocyanate.

24. The method according to claim 23, wherein the component containing active hydrogens is selected from the group consisting of alcohols, amines, thiols, phenols, silanol, —P—OH, —P—H, and mixtures thereof.

25. The method according to claim 23, wherein the component containing active hydrogens is an alcohol.

26. The method according to claim 17, wherein the reactive mixture further comprises fibrous reinforcement material.

27. The method according to claim 26, wherein the fibrous reinforcement material is selected from the group consisting of fiberglass, polyester, carbon, metal, organic fibers, and mixtures thereof.

28. The method according to claim 17, wherein the initiator is an organic peroxide initiator selected from the group consisting of cumene hydroperoxide; methyl ethyl ketone peroxide; benzoyl peroxide; acetyl peroxide; 2,5-dimethylhexane-2,5-dihydroperoxide; tert-butyl peroxybenzoate; di-tert-butyl perphthalate; dicumyl peroxide; 2,5-dimethyl-2,5-bis(tert-butylperoxide)hexane; 2,5-dimethyl-2,5-bis(tert-butylperoxy)hexyne; bis(tert-butylperoxyisopropyl)benzene; di(tert-butyl peroxide; 1,1-di(tert-amylperoxy)-cyclohexane; 1,1-di-(tert-butylperoxy)-3,3,5-trimethylcyclohexane; 1,1-di-(tert-butylperoxy)-cyclohexane; 2,2-di-(tert-butylperoxy)butane; n-butyl-4,4-di(tert-butylperoxy)valerate; ethyl-3,3-di-(tert-amylperoxy) butyrate; ethyl-3,3-di(tert-butylperoxy)-butyrate; t-butyl peroxy-neodecanoate; di-(4-5-butyl-cyclohexyl)-peroxydicarbonate; lauryl peroxide; 2,5-dimethyl-2,5-bis(2-ethyl-hexanoyl peroxy) hexane; t-amyl peroxy-2-ethylhexanoate; 2,2'-azobis(2-methyl-propionitrile); 2,2'-azobis(2,4-methylbutanenitrile); and mixtures thereof.

29. The method according to claim 17, wherein the reaction mixture further comprises a promoter.

30. The method according to claim 17, wherein said step of reacting the resin containing active hydrogens and the polycarbodiimide to chemically bind the resin and the polycarbodiimide is carried out at a temperature ranging from about 5° C. to about 60° C.

* * * * *

UNITED STATES PATENT AND TRADEMARK OFFICE
CERTIFICATE OF CORRECTION

PATENT NO. : 5,925,409
DATED : July 20, 1999
INVENTOR(S) : Hildeberto Nava

It is certified that error appears in the above-identified patent and that said Letters Patent is hereby corrected as shown below:

On the title page: Item [63] Publications: "Urethan"
to read -- Urethane --.

Signed and Sealed this

Twentieth Day of February, 2001

Attest:

NICHOLAS P. GODICI

Attesting Officer

Acting Director of the United States Patent and Trademark Office